(12) United States Patent
Gonzalez et al.

(10) Patent No.: US 7,659,802 B2
(45) Date of Patent: Feb. 9, 2010

(54) BI-STABLE MAGNETIC LATCH ASSEMBLY

(75) Inventors: Mario Gonzalez, Phoenix, AZ (US);
Steve L. Hadden, Peoria, AZ (US);
David A. Osterberg, Glendale, AZ (US);
Paul D. Buchele, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 566 days.

(21) Appl. No.: 11/376,829

(22) Filed: Mar. 15, 2006

(65) Prior Publication Data

US 2007/0216504 A1    Sep. 20, 2007

(51) Int. Cl.
*H01F 7/08* (2006.01)
(52) U.S. Cl. .......................... 335/200; 335/78
(58) Field of Classification Search .............. 335/78, 335/220–229, 272–274; 200/181
See application file for complete search history.

(56) References Cited

U.S. PATENT DOCUMENTS

| | | | | |
|---|---|---|---|---|
| 5,121,089 A * | 6/1992 | Larson | ......................... | 333/107 |
| 5,412,265 A * | 5/1995 | Sickafus | ............... | 310/40 MM |
| 5,955,818 A * | 9/1999 | Bertin et al. | ................. | 310/309 |
| 6,072,686 A * | 6/2000 | Yarbrough | .................. | 361/234 |
| 6,956,453 B2 * | 10/2005 | Osterberg | ................... | 335/229 |
| 7,013,057 B2 * | 3/2006 | Osterberg | .................... | 385/16 |
| 7,468,646 B2 * | 12/2008 | Osterberg | ................... | 335/179 |
| 2005/0029819 A1 | 2/2005 | Osterberg | | |
| 2005/0047709 A1 | 3/2005 | Smith | | |

FOREIGN PATENT DOCUMENTS

EP    1467472 A2    10/2004
FR    2397674 A     2/1979

OTHER PUBLICATIONS

PCT Search Report dated Mar. 20, 2009, PCT/US2006/047396.

* cited by examiner

*Primary Examiner*—Elvin G Enad
*Assistant Examiner*—Bernard Rojas
(74) *Attorney, Agent, or Firm*—Ingrassia Fisher & Lorenz, P.C.

(57) ABSTRACT

A bi-stable magnetic switch assembly comprises a stator having an axis and first and second magnetic portions angularly disposed there around, and a rotor having at least one magnetic region attracted to the first and second portions. The rotor is configured for rotation about the axis between (1) a first latched position wherein the region resides proximate to, but is spaced apart from, the first portion; and (2) a second latched position wherein the region resides proximate to, but is spaced apart from, the second portion. A spring biases the rotor to a position where the region resides intermediate the first and second portions. A coil, which is associated with at least one of the first portion, the second portion, and the region, may be energized to reduce the force of attraction between the region and the first and second portions when in the first and second latched positions, respectively.

18 Claims, 8 Drawing Sheets

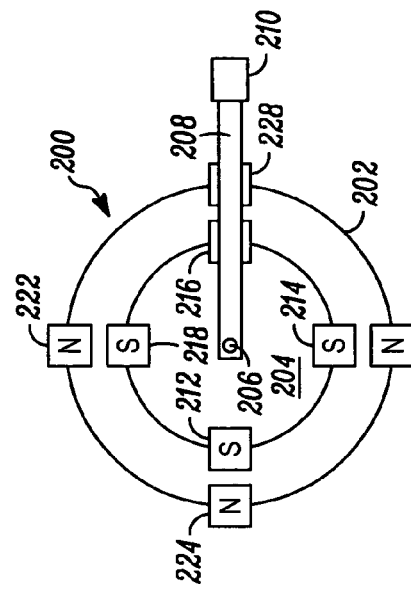
FIG. 6
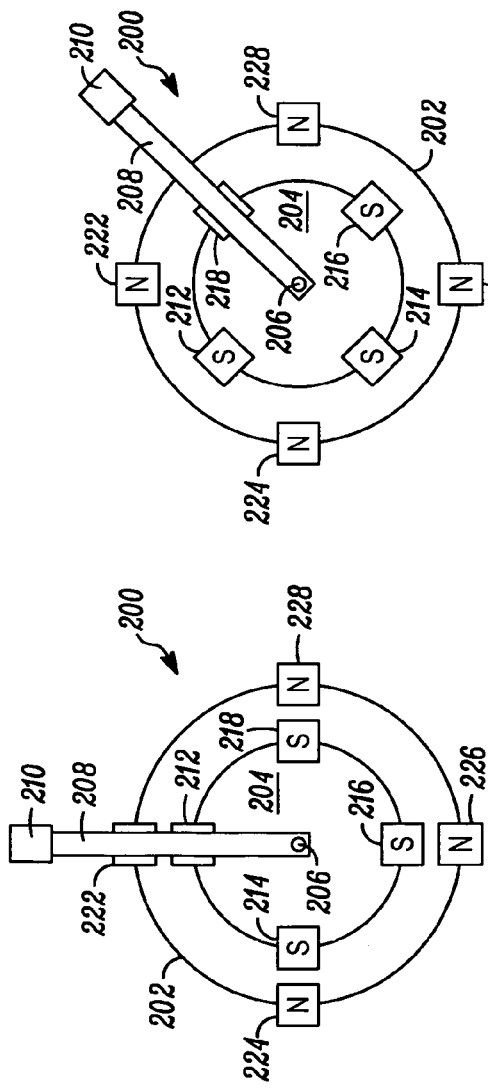
FIG. 7
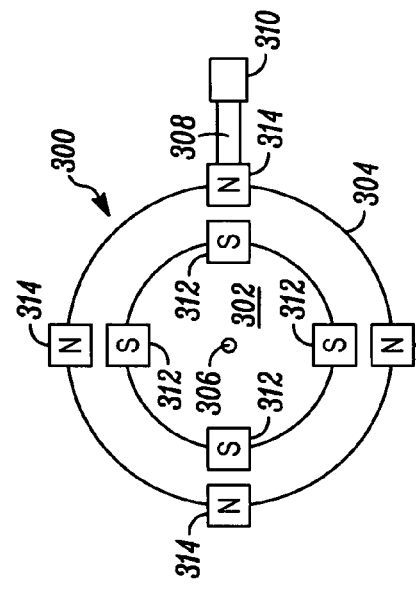
FIG. 8
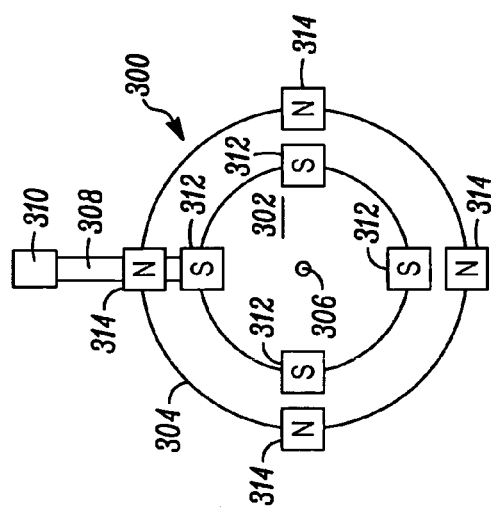
FIG. 9
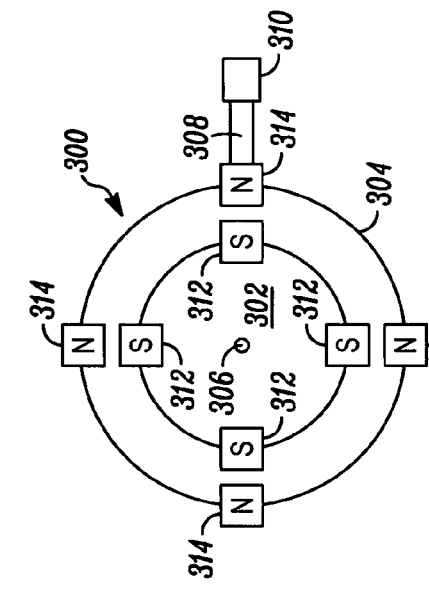
FIG. 10
FIG. 11

BI-STABLE MAGNETIC LATCH ASSEMBLY

STATEMENT REGARDING FEDERALLY SPONSORED RESEARCH OR DEVELOPMENT

This invention was made with Government support under S7-6BT476X awarded by Raytheon. The Government has certain rights in this invention.

TECHNICAL FIELD

The present invention relates to a magnetic latch and, more particularly, to a non-contacting, bi-stable magnetic latch assembly particularly suited for use as a spring-biased optical switch.

BACKGROUND

Optical switching systems designed to switch one or more optical elements (e.g., various lenses) into and out of an optical path are known and may be utilized in, for example, satellite applications. One relatively familiar type of optical switching system employs a processor, a motor, and a wheel mechanism having a plurality of optical elements disposed along its perimeter. The processor is coupled to the motor, which is, in turn, coupled to the wheel mechanism. An optical path passes through a portion of the wheel's perimeter such that the wheel may be rotated by the motor about the wheel's central axis to position a given optical element within the optical path. To move the optical element into the optical path, the processor first establishes the current rotational position of the wheel and subsequently determines the rotational adjustment required to move the desired optical element into the optical path. The processor then commands the motor to perform the required adjustment.

Unfortunately, in conventional optical switching systems of the type described above, the amount of time and energy required to move a newly selected optical element into the optical path may be undesirably high, especially when the newly selected optical element is disposed opposite the formally selected element, due to the sequential configuration of the optical elements around the perimeter of the wheel. Though the amount of time required for optical element switching may be improved by increasing the speed at which the wheel rotates, the rapid movement of the wheel may cause system disturbances (e.g., vibrations), which may blur the optical image and interfere with precise optical controls. To compensate for the disturbances that a rapidly moving wheel may cause, some systems provide for long settling periods after wheel movement; however, this solution involves undesirably long delays and is consequently less than ideal. Other known optical switching systems employ complex force compensation and/or isolation mechanisms to address system disturbances. However, such mechanisms increase system complexity and, in some cases, decrease system reliability.

To help mitigate the above-noted drawbacks, specialized optical element switch assemblies have been developed. Individual switch assemblies of this type may comprise a spring-biased pivot shaft coupled to an actuator arm having an optical element included thereon (e.g., coupled to one end thereof). The pivot shaft biases the actuator arm between first and second latched positions, which may position the optical element within and outside of the optical path, respectively. When the arm is held in one of the latched positions, the spring-biased pivot shaft exerts a rotational force on the arm in the direction of the other latched position. Thus, when released from a latched position at which it has been held, the actuator arm will swing under the influence of the pivot shaft toward the other latched position. Due to unavoidable system losses, the spring-biased pivot shaft will not provide enough energy to fully rotate the arm to the other latched position. Therefore, a latch mechanism is provided to help complete the arm's rotation and secure the arm at the other latched position against the force of spring-based pivot shaft. This mechanism may be mechanical, but is preferably magnetic. With reference to the later, a magnetic latch mechanism may comprise a permanent magnet configured to attract and physically engage a portion of the arm (e.g., a terminal end of the arm opposite the optical element), which may also be equipped with a magnet. This configuration is advantageous in that the arm may be held in a desired position for an indefinite period of time with little to no power consumption. To release the arm from a latched position, a control coil may be provided around a magnet disposed on the actuator arm or the magnet employed by the magnetic latch so as to form an electromagnet. When current is delivered to the coil, a magnetic field is generated counter to the field produced by the magnetic latch mechanism, and the actuator arm is released. The actuator arm then rotates under the force of the spring-biased pivot shaft toward the opposite latched position. A second magnetic latch mechanism, which again provides the additional energy required to fully rotate the arm, then physically engages the arm and secures it at the other latched position.

For the above described reasons, optical element switch assemblies employing spring-biased pivot shafts represent a considerable improvement over assemblies employing wheel-based mechanisms. However, even these improved assemblies present certain problems. For example, such assemblies may still produce physical disturbances when securing the actuator arm at a latched position. These disturbances occur because the field strength of the magnets employed by a magnetic latching mechanism must of a relatively high magnitude so as to overcome an opposing rotational force exerted on the arm by the pivot shaft in order to pull the actuator arm into a latched position resulting in significant impact between the arm and the switch assembly and, thus, a relatively high contact force being transmitted to the switch assembly upon actuator arm latching. This, in turn, results in unwanted shock and vibration throughout the switch assembly. Though secondary spring assemblies may be provided proximate either latched position to physically engage the actuator arm and oppose the force of the magnetic latch to soften the impact, these arrangements are complex, costly, and do not fully eliminate system disturbances.

In view of the above, it should be appreciated that it would be desirable to provide a switching assembly (e.g., of the type used to switch one or more optical elements into and out of an optical path) that minimizes system impact disturbances by employing a magnetic latching mechanism capable of securing a rotatable arm without physically contacting the actuator arm. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides a bi-stable magnetic switch assembly that comprises a stator having an axis and first and second magnetic portions angularly disposed there around, and a rotor having at least one magnetic region attracted to the first and second portions. The rotor is configured for rotation about the axis between (1) a first latched position wherein the region resides proximate to, but is spaced apart from, the first portion; and (2) a second latched position wherein the region resides proximate to, but is spaced apart from, the second portion. A spring biases the rotor to a position where the region resides intermediate the first and second portions. A coil, which is associated with at least one of the first portion, the second portion, and the region, may be energized to reduce the force of attraction between the region and the first and second portions when in the first and second latched positions, respectively.

The foregoing and other objects, features and advantages of the preferred switch assembly will be apparent from the following more particular description of a preferred embodiment of the invention, as illustrated in the accompanying drawings.

BRIEF DESCRIPTION OF THE DRAWINGS

The preferred exemplary embodiment of the present invention will hereinafter be described in conjunction with the appended drawings, where like designations denote like elements, and:

FIGS. 6-8 are functional top views of a magnetic latch assembly in a first latched position, an intermediate rotational position, and a second latched position, respectively, in accordance with the present invention;

FIGS. 9-11 are functional top views of a magnetic latch assembly in a first latched position, an intermediate rotational position, and a second latched position, respectively, in accordance with the present invention;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
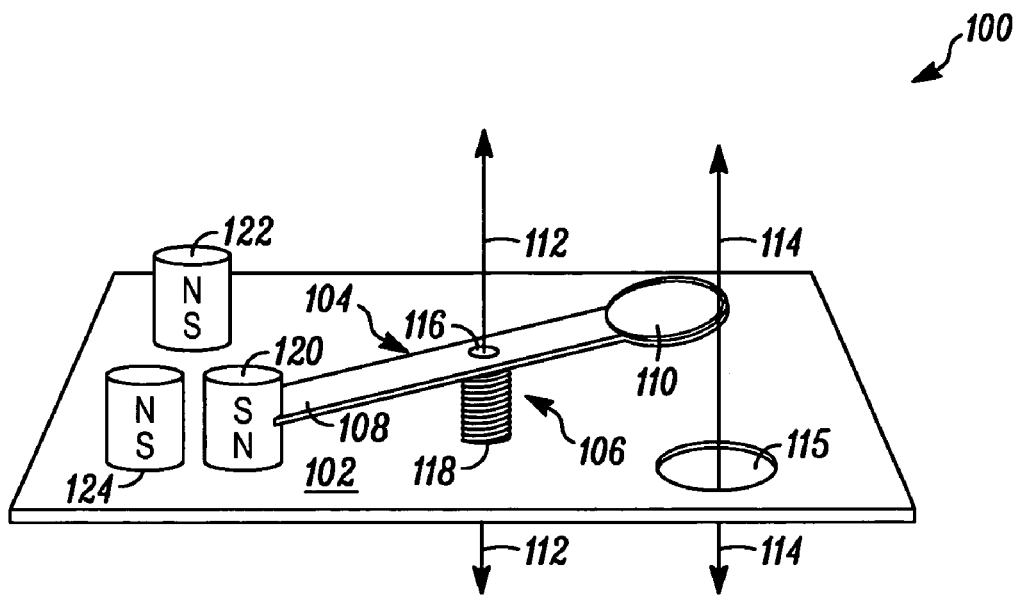
FIGS. 1 and 2 are isometric views illustrating a magnetic latch assembly in a first latched position and a second latched position, respectively, in accordance with the present invention.
Figure 2:
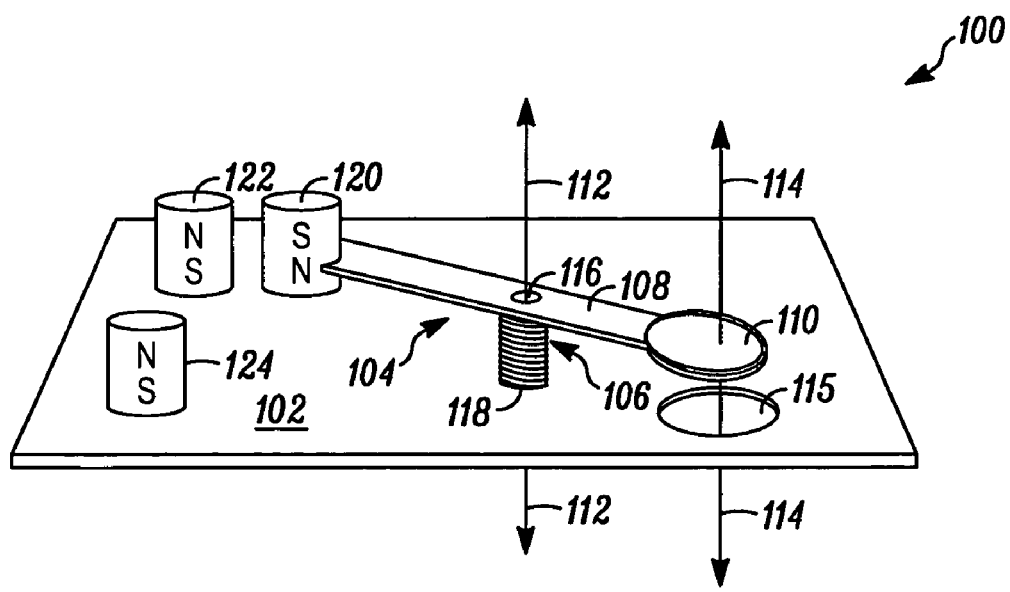
Figure 4:
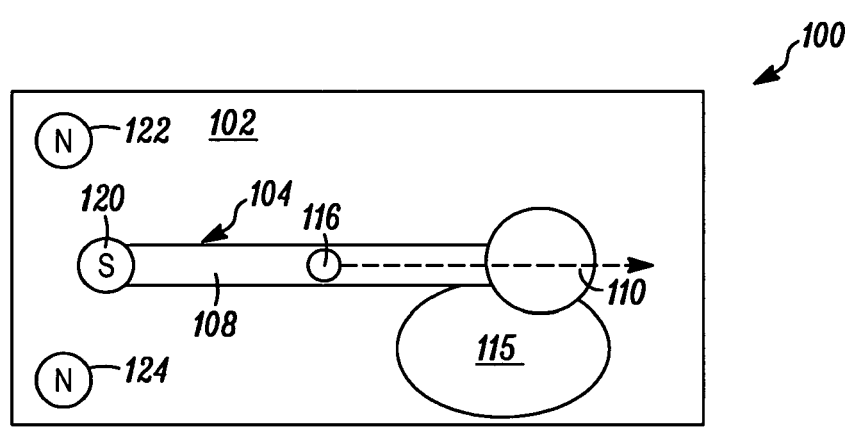
Figure 5:
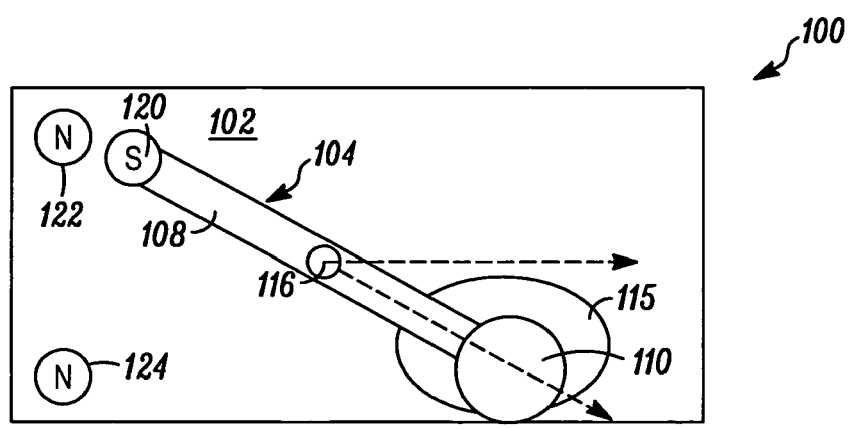

FIGS. 1 and 2 are isometric views of a simplified bi-stable, non-contacting magnetic latch assembly 100 in first and second latched positions, respectively, in accordance with the present invention. Magnetic latch assembly 100 is further illustrated in FIGS. 3-5, which are top views of assembly 100 in the first latched position, an intermediate rotational position, and the second latched position, respectively. Latch assembly 100 comprises a stator 102 and a rotor 104, which, in turn, comprises a spring-biased pivot mechanism 106 and an actuator arm 108 having an optical element (e.g., a filter, mirror, optical source, etc.) 110 coupled to an end thereof. Actuator arm 108 may be any structural member that may accept optical element 110 and that has sufficient rigidly to effectively control the position thereof. Rotor 104 is configured to rotate relative to stator 102 about an axis 112 to move optical element 110 into and out of an optical path 114, which passes through an aperture 115 provided through stator 102. In the depicted embodiment, optical element 110 is disposed outside of optical path 114 when rotor 104 is in the first latched position (FIGS. 1 and 3) and inside of optical path 114 when rotor 104 is in the second latched position (FIGS. 2 and 5).

Figure 3:
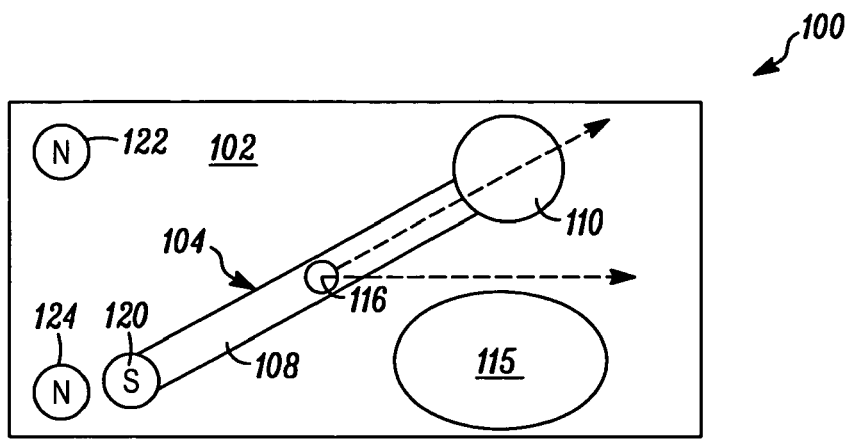
FIGS. 3-5 are functional top views of the assembly shown in FIGS. 1 and 2 in the first latched position, an intermediate rotational position, and the second latched position, respectively.

As is most clearly shown in FIGS. 1 and 2, pivot mechanism 106 includes a rotatable shaft 116 and a spring (e.g., a torsion bar spring) 118, which is disposed around shaft 116 and fixedly coupled to actuator arm 108 and to stator 102 at, for example, opposite ends thereof. Spring 118 biases rotor 104 to the intermediate rotational position (FIG. 4) between the first latched position (FIGS. 1 and 3) and the second latched position (FIGS. 2 and 5). Thus, when rotor 104 is in the first latched position (FIGS. 1 and 3), spring 118 exerts a rotational force on rotor 104 in the direction of the second latched position (FIGS. 2 and 5). Conversely, when rotor 104 is in the second latched position (FIGS. 2 and 5), spring 118 exerts a rotational force on rotor 104 in the direction of the first latched position (FIGS. 1 and 3). Considering this, it should be appreciated that, if the rotational movement of rotor 104 was dictated entirely by pivot mechanism 106 and if rotor 104 was physically moved to either of the latched positions and then released, rotor 104 would oscillate in a region between the latched positions before ultimately coming to rest at the intermediate rotational position illustrated in FIG. 4. As will be seen, however, latch assembly 100 is configured to magnetically catch and hold rotor 104 at the latched positions until released.

To accomplish the above-described magnetic latching action, two or more stator magnets are provided at spaced intervals along stator 102 and at least one rotor magnet is provided on rotor 104 and disposed so as to be attracted to the stator magnets. In latch assembly 100, for example, two stator magnets 122 and 124 are disposed on stator 102 generally opposite aperture 115, and one rotor magnet 120 is fixedly coupled to an end of arm 108 opposite optical element 110. Stator magnets 124 and 122 are disposed on stator 102 such that their north and south poles reside proximate the respective south and north poles of rotor magnet 120 when in the first and second latched positions, respectively. When rotor 104 rotates in the first latched position (FIGS. 1 and 3), rotor magnet 120 rotates along therewith into a position adjacent stator magnet 124. Similarly, when rotor 104 rotates into the second latched position (FIGS. 2 and 5), rotor magnet 120 rotates into a position adjacent stator magnet 122. Due to the movement of rotor magnet 120 between a first position adjacent magnet 124 and a second position adjacent magnet 122, stator magnets 124 and 122 may be jointly referred to a stator magnet pair. Additionally, stator magnet 122, stator magnet 124, and rotor magnet 120 may be collectively referred to as a magnetic latch grouping because these magnets interact with each other to provide the magnetic latching action that rotates rotor 104 into and secures rotor 104 at the latched positions.

It should be noted that, although the spatial gap separating rotor magnet 120 from stator magnet 124 when rotor 104 is in the first latched position and that separating rotor magnet 120 from stator magnet 122 when rotor is in the second latched position may be relatively small, rotor magnet 120 does not physically contact stator magnet 122 or stator magnet 124. It should also be noted that the term "magnet" as used in this application should be understood in a broad sense as any body having magnetic dipoles, whether natural or induced. Thus, the term "magnet" includes a body, such as an iron pole piece, that is coupled to a permanent magnet and generates a magnetic field. The term "magnet" also encompasses a region or portion of a body that is so coupled. It should further be noted that while a torsion bar spring has been shown in FIGS. 1 and 2, other types of spring assemblies may be employed (e.g. a magnetic spring).

When rotor 104 is in the intermediate position (FIG. 4), rotor magnet 120 is equidistant from stator magnet 122 and stator magnet 124. Thus, at this position, the magnetic forces acting on rotor 104 are substantially balanced, and rotor 104 is not magnetically biased toward either latched position. At any other rotational position, however, rotor 104 will be magnetically biased toward either the first or the second latched position. More specifically, rotor 104 will be magnetically biased toward the first latched position when rotor 104 is closer to the first latched position than to the second latched position (the distance between rotor magnet 120 and stator magnet 124 will be less than the distance between rotor magnet 120 and stator magnet 122). As rotor 104 rotates closer to the first latched position, the distance between rotor magnet 120 and stator magnet 124 will decrease, and the force of attraction between magnet 120 and magnet 124 will grow increasingly stronger. When rotor 104 has rotated fully into the first latched position, the force of magnetic attraction between rotor magnet 120 and stator magnet 124 will be at its greatest and sufficient to prevent rotor 104 from rotating back under the influence of pivot mechanism 106 toward the second latched position. Conversely, as rotor 104 nears the second latched position and the force of attraction between magnet 120 and magnet 122 will grow increasingly stronger. When rotor 104 has rotated fully into the second latched position, the force of attraction between rotor magnet 120 and magnet 124 will be at its greatest and sufficient to prevent rotor 104 from rotating under the influence of pivot mechanism 106 toward the first latched position. Thus, when rotated into either the first or second latched position, rotor 104 will be secured thereat by magnetic forces and may not rotate under the influence of pivot mechanism 106 toward the other latched position until released in the manner described below.

Rotor 104 may be released from a latched position in either of two ways: (1) by applying an additional force to rotor 104 in the direction of the other latched position, or (2) by lessening the force of magnetic attraction between rotor magnet 120 and the adjacent stator magnet. In preferred embodiments described more fully below, the inventive latch assembly is configured to implement the later strategy, possibly in conjunction with the first. As will be seen, this may be accomplished by disposing one or more control coils around one or more of the rotor magnets and/or a plurality of the stator magnets. When current is delivered to the control coil (or coils), a magnetic field is generated that decreases the force of attraction between the magnet to which the coil is coupled and any neighboring magnets. This temporary reduction in the force of magnetic attraction permits actuator 104 to rotate under the influence of pivot mechanism 106 toward the other latched position.

Referring still to FIGS. 1-5, first and second control coils may be disposed around stator magnets 122 and 124, respectively, to diminish the magnet latching force and release rotor 104 from a latched position. For example, if rotor 104 is currently secured at the first latched position (FIGS. 1 and 3) by the magnetic interaction between stator magnet 120 and rotor magnet 124, rotor 104 may be released from this position by providing a current to the control coil around stator magnet 120 to reduce the net force of attraction between magnets 120 and 124 and to permit rotor 104 to rotate under the influence of pivot mechanism 106 toward the second latched position (FIGS. 2 and 5). When rotor 104 nears the second latched position, the force of attraction between stator magnet 120 and rotor magnet 122 provides the additional energy to rotate rotor 104 fully into the second latched position and secures rotor 104 thereat. Rotor 104 remains latched at the second latched position until the second control coil disposed around stator magnet 122 is energized.

FIGS. 6-8 are functional top views of a magnetic latch assembly 200 in a first latched position, an intermediate rotational position, and a second latched position, respectively, in accordance with the present invention. As does previously-described latch assembly 100, latch assembly 200 comprises a stator 202 and a rotor 204. However, in latch assembly 200, stator 202 and rotor 204 are generally cylindrical in shape, and stator 202 includes an inner surface defining a generally cylindrical cavity into which rotor 204 is disposed. As was previously the case, rotor 204 comprises a spring-biased pivot shaft 206 and an actuator arm 208 having an optical element 210 coupled to an end thereof. Rotor 202 further comprises a plurality of rotor magnets angularly disposed around a perimeter thereof. As can be seen in FIGS. 6-8, rotor 202 is provided with four such magnets (i.e., rotor magnets 212, 214, 216, and 218) disposed around an outer perimeter of rotor 202 at approximately ninety degree intervals relative to the longitudinal axis of pivot shaft 206 (referred to hereafter as the rotational axis). Similarly, stator 204 is provided with four stator magnets (i.e., stator magnets 222, 224, 226, and 228), which are disposed around the inner surface of stator 204 at approximately ninety degree intervals relative to the rotational axis. The stator magnets and the rotor magnets are disposed so as to be magnetically attracted to one another. For example, as illustrated in FIGS. 6-8, rotor magnets 212, 214, 216, and 218 may be disposed such that their poles may reside opposite the poles of stator magnets 122, 224, 226, and 228, respectively.

Rotor 204 rotates within stator 202 about the rotational axis between a first latched position (FIG. 6) and a second latched position (FIG. 8). When in the first latched position, rotor magnets 212, 214, 216, and 218 are substantially adjacent, but do not contact, stator magnets 222, 224, 226, and 228, respectively. When in the second latched position (FIG. 8), rotor 104 has rotated clockwise by approximately 90 degrees, and rotor magnets 212, 214, 216, and 218 are substantially adjacent, but do not contact, stator magnets 224, 226, 228, and 222, respectfully. Latch assembly 200 operates in much the same way as does assembly 100 described above; that is, a spring-biased pivot mechanism biases rotor 204 toward the intermediate rotational position (FIG. 7), while the stator and rotor magnets bias rotor 204 toward the first latched position (FIG. 6) when rotor 204 is between the intermediate rotational position and the first latched position, and toward the second latched position (FIG. 8) when rotor 204 is between the intermediate rotational position and the second latched position. When rotor 204 approaches a latched position under the rotational influence of pivot shaft 206, magnetic latching forces provide the energy to fully rotate rotor 204 into the latched position and secure rotor 204 thereat. As has been briefly described above, and as will be more fully described below, rotor 204 may be released from the first or second latched position by energizing one or more control coils provided around one or more of the stator magnets and/or one or more of the rotor magnets.

FIGS. 9-11 are functional top views of a magnetic latch assembly 300 in a first latched position, an intermediate rotational position, and a second latched position, respectively, in accordance with the present invention. Very briefly, latch assembly 300 comprises an inner stator 302 and an outer rotor 304, a spring-biased pivot shaft 306, and an actuator arm 308 having an optical element 310 coupled to an end thereof. A plurality of stator magnets 312 are provided at angularly spaced intervals around a perimeter of stator 302, and a plurality of rotor magnets 314 are provided at angularly spaced intervals around the perimeter rotor 304 and disposed so as to be attracted to the plurality of stator magnets 312. Latch assembly 300 operates in essentially the same way as does latch assembly 200 described above in conjunction with FIGS. 6-8; thus, a detailed discussion of the operation of latch assembly 300 is considered unnecessary at this time; however, it should be clear that the system may include an outer rotor 304 and an inner stator 302.

Figure 12:
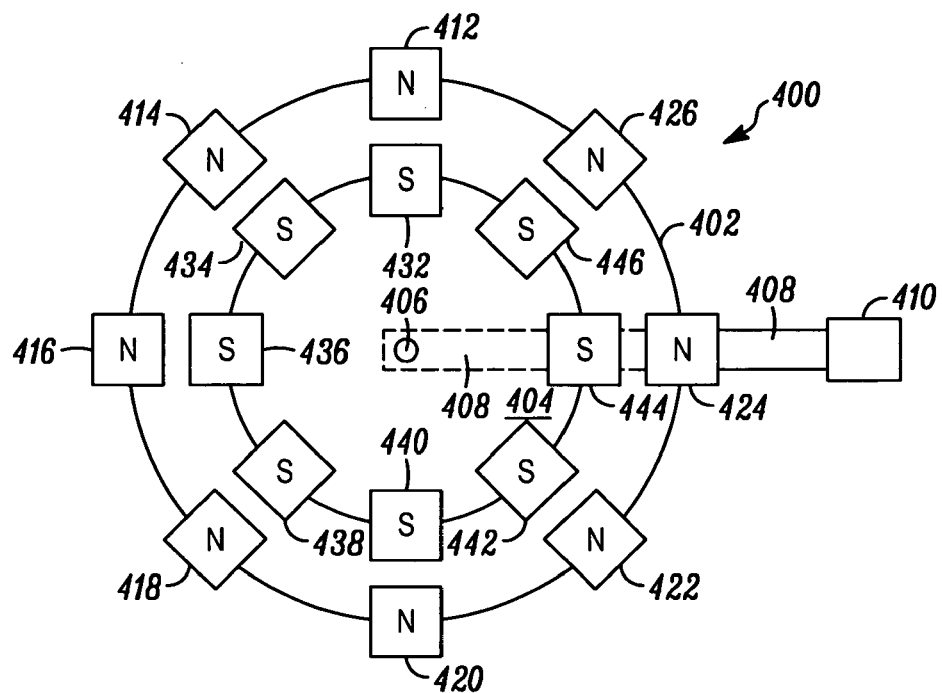
FIG. 12 is a functional top view of a magnetic latch assembly in accordance with the present invention.

FIG. 12 is a functional top view of a magnetic latch assembly 400 in accordance with the present invention. Latch assembly 400 is similar to latch assembly 200 discussed previously in conjunction with FIGS. 6-8 and comprises a stator 402 and a rotor 404, which, in turn, comprises a spring-biased pivot shaft 406 and an actuator arm 408 having an optical element 410 coupled to an end thereof. Additionally, stator 402 includes an inner surface defining a generally cylindrical cavity into which rotor 404 is disposed. However, unlike latch assembly 200, actuator arm 408 is coupled to rotor 404 proximate an underside of assembly 400 and is thus partially shown in phantom in FIG. 12. Also unlike latch assembly 200, stator 402 and rotor 404 are each provided with eight magnets, which are angularly disposed around the longitudinal axis of pivot shaft 406 (again, referred to hereafter as the rotational axis). In particular, stator 402 is provided with stator magnets 412, 414, 416, 418, 420, 422, 424, and 426 around an inner perimeter thereof, and rotor 404 is provided with rotor magnets 432, 434, 436, 438, 440, 442, 444, and 446 around an outer perimeter thereof. As indicated in FIG. 12, the rotor magnets are disposed so that their poles are opposite those of the stator magnets. Due to this orientation, the stator magnets and the rotor are mutually attracted and will bias latch assembly 400 toward either the first or the second rotational position in the manner described above. Again, one or more control coils may be disposed around one or more of the stator magnets, the rotor magnets, or both the stator and rotor magnets to selectively reduce of the net force of attraction between adjacent pairs of magnets and thereby release rotor 404 from a latched position.

Figure 13:
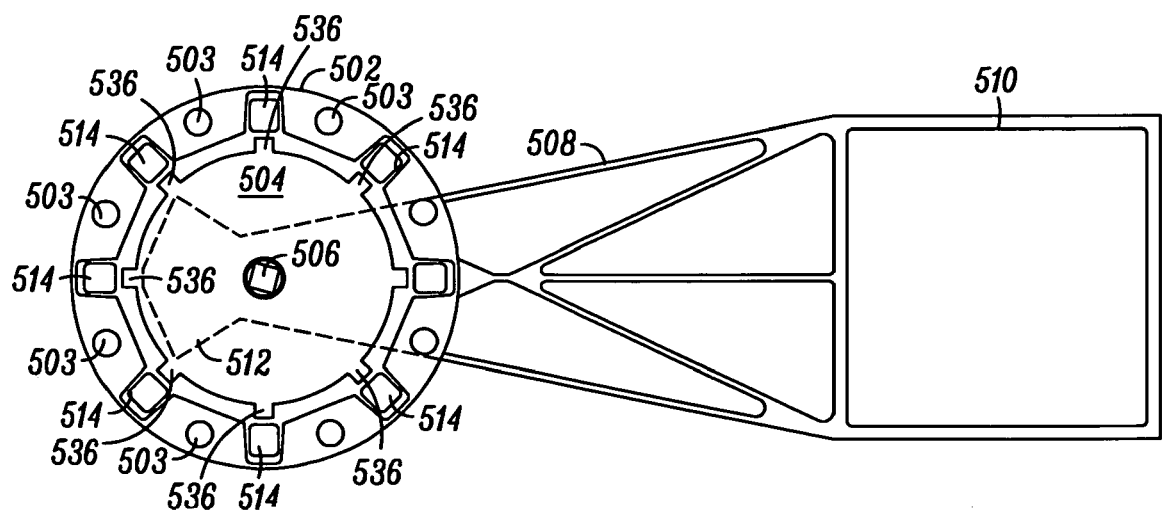
FIGS. 13-15 are top, isometric, and isometric cross-sectional views of a magnetic latch assembly in accordance with an exemplary embodiment of the present invention.
Figure 14:
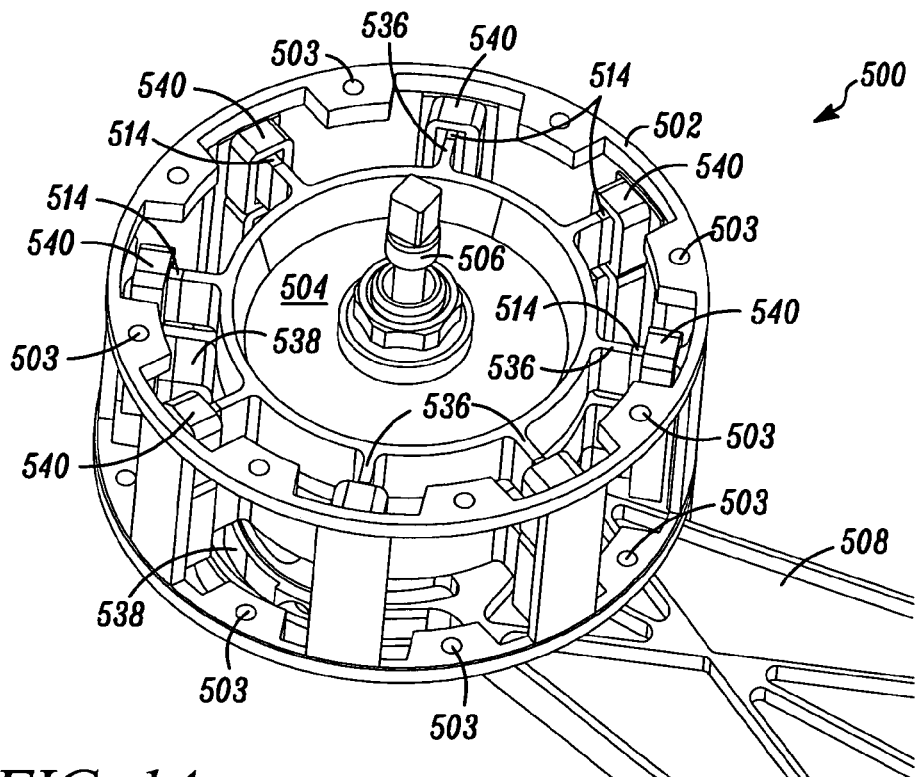
Figure 15:
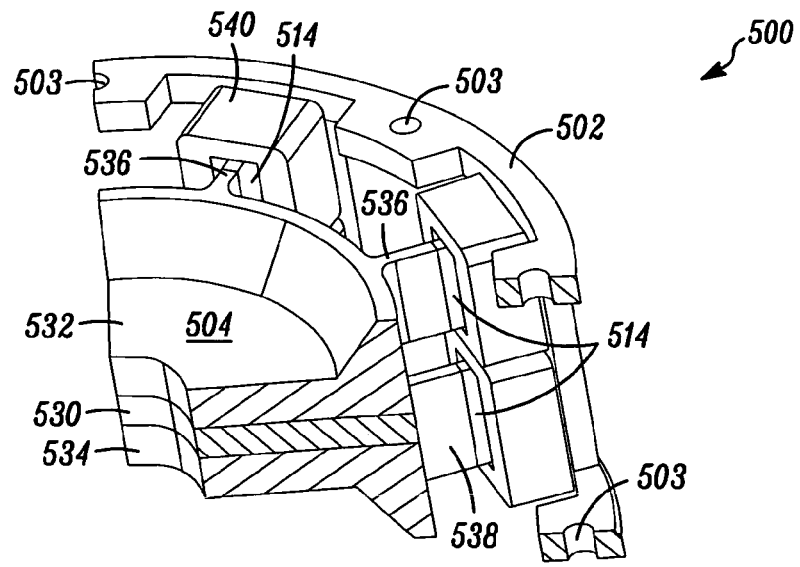

FIGS. 13-15 are top, isometric, and isometric cross-sectional views of a latch assembly 500 in accordance with an exemplary embodiment of the present invention. Latch assembly 500 is similar to latch assembly 400 described above. That is, latch assembly 500 includes a stator 502 and a rotor 504 comprising a spring-biased pivot shaft 506 and an actuator arm 508 having an optical element 510 fixedly coupled to a first end thereof. Assembly 500 also includes a counterweight 512 that is fixedly coupled to arm 508 at a second end thereof substantially opposite optical element 510. Counterweight 512 helps balance arm 508 to minimize system disturbances (e.g., vibrations) as rotor 504 rotates between latched positions. As was the case previously, stator 502 is provided with eight stator magnets 514, which are angularly spaced around the longitudinal axis of pivot shaft 506 (i.e., the rotational axis). Stator 502 is also provided with a plurality of apertures 503 therethrough that are each configured to receive a fastening device (e.g., a bolt, a wedge nut, etc.) to secure stator 402 within a housing (not shown). In contrast to rotor 404 of assembly 400, rotor 504 is provided with a single, relatively large magnet 530 most easily seen in FIG. 15. Magnet 530 is disc-like in shape and disposed within rotor 504 between an upper pole piece 532 and a lower pole piece 534. Magnet 530, pole piece 532, and pole piece 534 form a sandwich assembly that rotates jointly about the rotational axis. Pole piece 532 is provided with a plurality of upper radial teeth 536, which extend outward from pole piece 532 toward the inner surface of rotor 502. Pole piece 534 is also provided with eight lower radial teeth 538, which are similarly disposed and which align vertically with upper radial teeth 536. Due to the configuration of rotor 504, upper radial teeth 536 and lower radial teeth 538 will have opposite polarities. Together, each pair of upper and lower teeth thus forms a magnetic region, which is configured for attraction to the stator magnets. Thus, it should be appreciated that, although rotor 504 comprises only one magnet 530, rotor 504 will function similarly to rotor 404 (FIG. 12).

Figure 16:
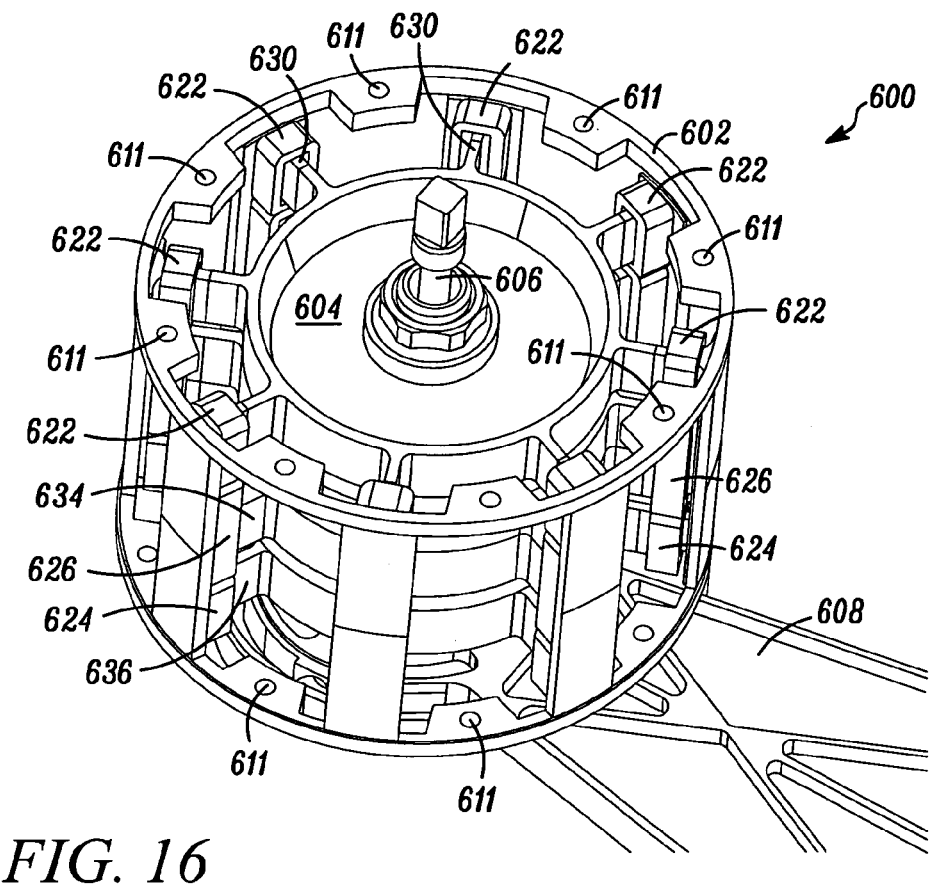
FIGS. 16-18 are isometric, isometric cross-sectional, and exploded views of a magnetic latch assembly in accordance with an exemplary and preferred embodiment of the present invention.
Figure 17:
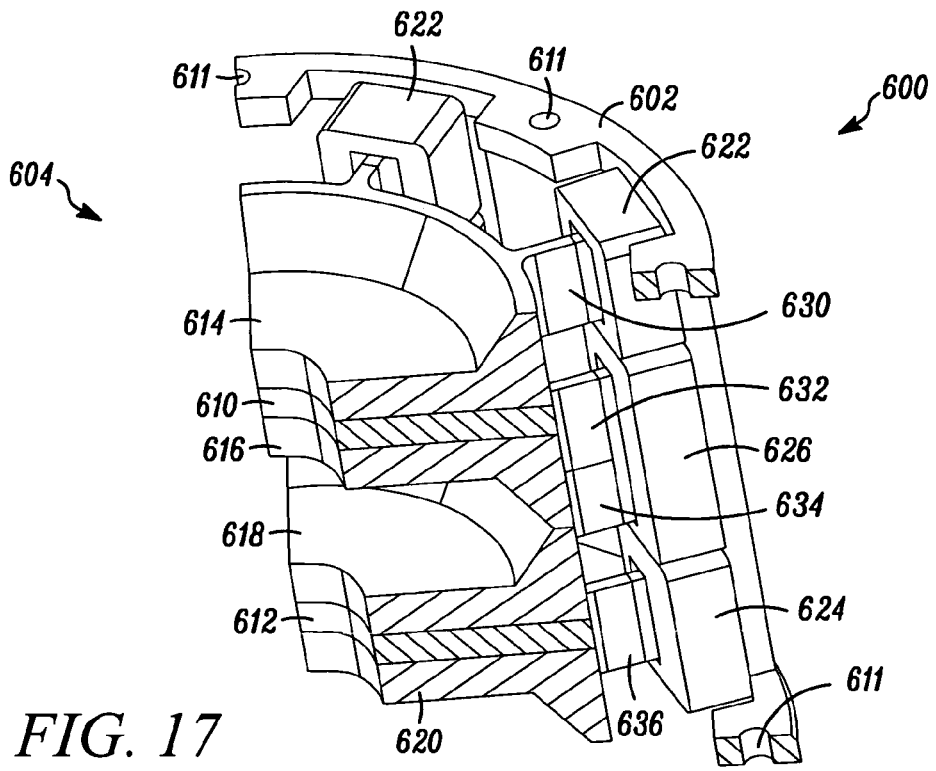
Figure 18:
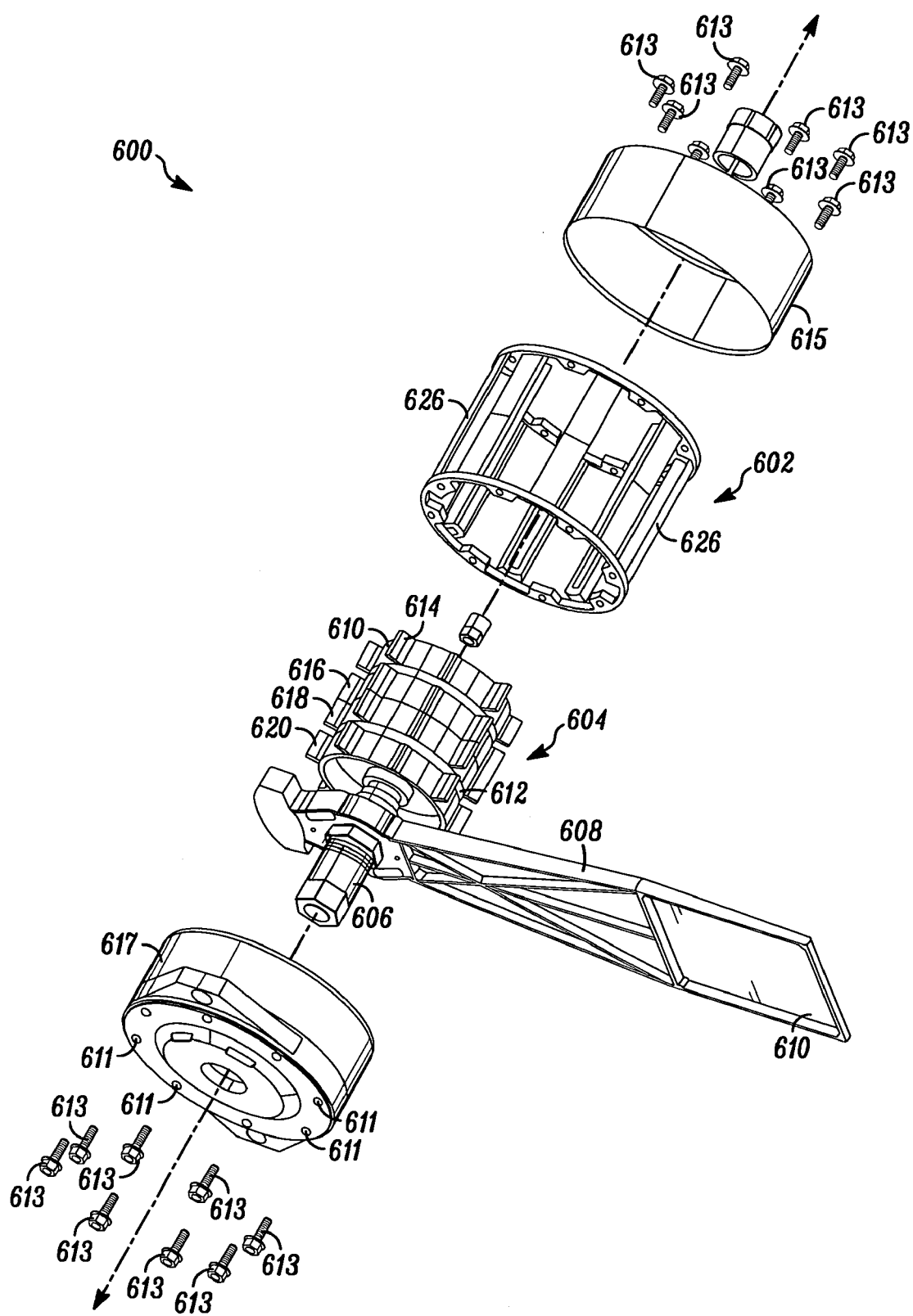

FIGS. 16-18 are isometric, isometric cross-sectional, and exploded views of a latch assembly 600 in accordance a preferred embodiment of the present invention. Latch assembly 600 comprises a stator 602, a rotor 604, a pivot shaft 606, an actuator arm 608, and an optical element 610 (FIG. 18), which function in the manner described above. A plurality of apertures 611 are provided through upper and lower portions of stator 602. As can be seen in FIG. 18, apertures 611 are configured to receive fasteners 613 to secure an upper housing 615 and a lower housing 617 to stator 6032. Latch assembly 600 differs from the previous latch assembly 500 in the configuration of stator 602 and rotor 604. In particular, rotor 604 includes first and second central, disc-like magnets 610 and 612. Magnet 610 is disposed between an upper pole piece 614 and a lower pole piece 616, which have first series of teeth 630 and second series of teeth 632 extending radially outward therefrom, respectively. Similarly, magnet 612 is disposed between an upper pole piece 618 and a lower pole piece 620, which have a first series of teeth 634 and a second series of teeth 636 extending radially outward therefrom, respectively. Stator 602 includes an upper plurality of stator magnets 622 and a lower plurality of stator magnets 624, which are vertically aligned. A series of control coils 626 is provided around an equatorial region of stator 602. Each of these control coils 626 is disposed around a lower portion of a stator magnet 622 and an upper portion of a vertically aligned stator magnet 624, and, when energized, may simultaneously decrease the force of attraction between rotor magnet 610 and stator magnets 622 and rotor magnet 612 and stator magnets 624. Thus, by disposing control 626 in this manner, latch assembly 600 requires less power to release rotor 604 from a latched position.

Figure 19:
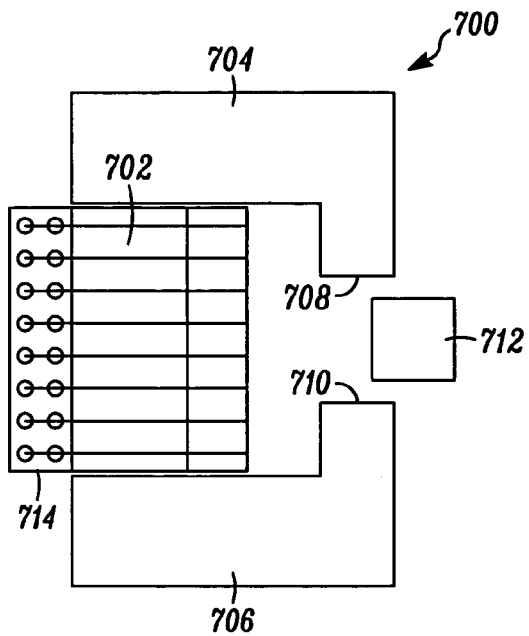
FIGS. 19 and 20 are cross-sectional views of first and second latch arrangements, respectively, in accordance with the present invention.
Figure 20:
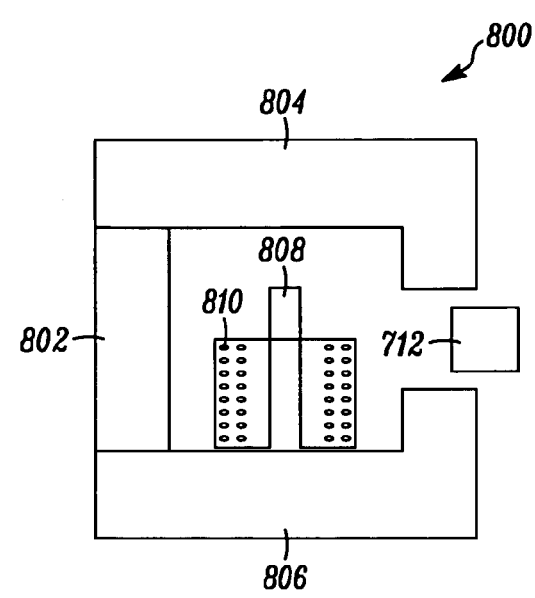

Though a particular type of magnetic latching arrangement was discussed above wherein each rotor magnet (or a magnetically charged region on the rotor) was separated from neighboring stator magnets by an axial gap to avoid physical impact during latching, it should be appreciated that other latching arrangements exist suitable for implementing the present invention. For example, the stator may be equipped with a plurality of horseshoe-shaped regions into which the rotor magnets extend. FIGS. 19 and 20 are cross-sectional views of two such horseshoe arrangements 700 and 800, respectively. Referring first to FIG. 19, arrangement 700 comprises a magnet 702 that is fixedly coupled to an upper pole piece 704 and a lower pole piece 706 at opposite ends thereof. Magnet 702, pole piece 704, and pole piece 706 cooperate to form a C-shaped or a horseshoe-shaped body having a first polarized end 708 and a second polarized end 710, which are separated by a radial gap through which a rotor magnet (or magnetically charged region) 712 may pass. Rotor magnet 712 is configured to be magnetically attracted to polarized ends 708 and 710 and resides there between when the rotor is in the first latched position. A control is coil provided around magnet 702 to release rotor magnet 712 from the first latched position when energized in the manner described above.

FIG. 20 is a cross-sectional view of a second horseshoe arrangement 800 comprising a magnet 802 that is fixedly coupled to an upper pole piece 804 and a lower pole piece 806 at opposite ends thereof. In contrast to arrangement 700, arrangement 800 includes a central post 808 around which a control coil 810 is disposed. Control coil 810 is configured to release rotor magnet 712 from a latched position in the manner described above. By disposing control coil 810 around central post 808 in this manner, arrangement 800 achieves a more efficient power usage, which may be particularly desirable if the inventive latch assembly is employed as a satellite-mounted optical switch.

Figure 21:
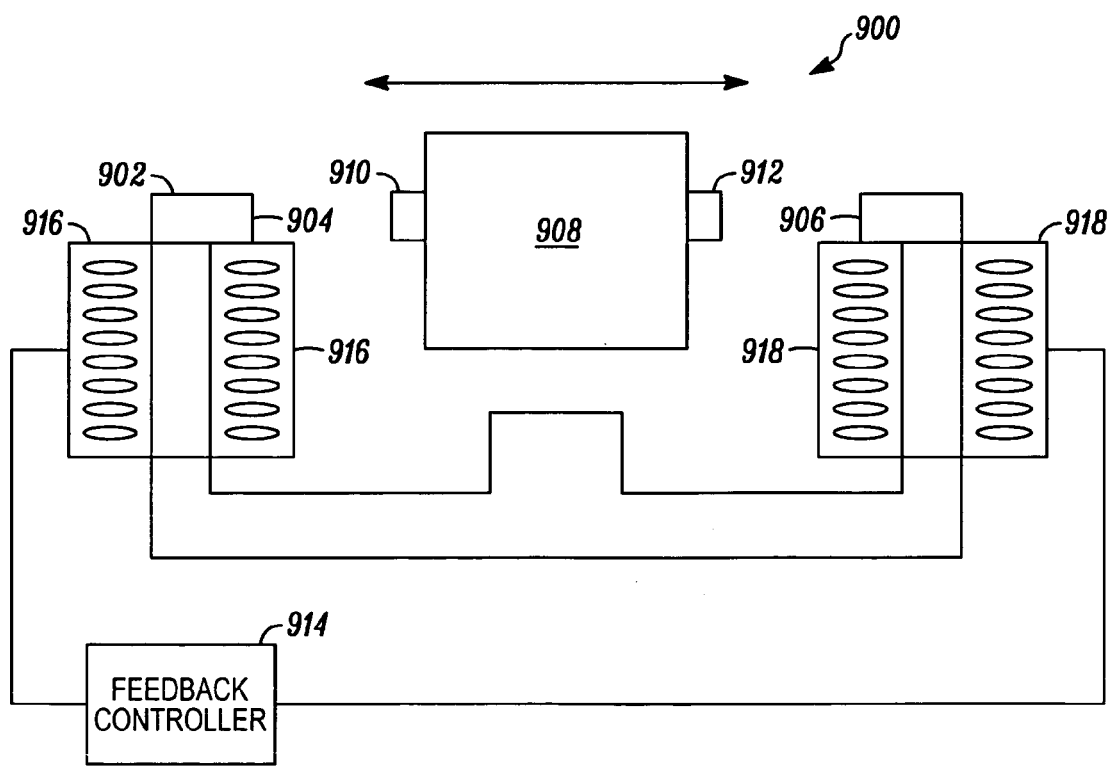
FIG. 21 is a cross-sectional view of a dampening system that may be deployed on the inventive switch assembly to help minimize system disturbances.

FIG. 21 is a cross-sectional view of a dampening system 900 that may be deployed on the inventive switch assembly to help decrease system disturbances by minimizing rotor oscillation. System 900 comprises a magnetic circuit 902 having a first end 904 and a second end 906. A portion of a rotor (e.g., a counterbalance) 908, which is equipped with a first magnet 910 and a second magnet 912 on opposite sides thereof, is disposed between ends 904 and 906. When the rotor is in the first latched position, magnet 910 is proximate end 904, and, when the rotor is in the second latched position, magnet 912 is proximate end 906. A feedback circuit controller 914 is electrically coupled to a first control coil 916 and a second control coil 918 which are disposed on circuit 902 proximate first end 904 and second end 906, respectively. Feedback circuit controller 914 monitors the disposition of counterbalance 908 between ends 904 and 906 to determine rotor velocity in the well-known manner and modulates the current supplied to coils 916 and 918 in relation thereto the disposition and velocity of the rotor. By controlling the manner in which ends 904 and 906 repel and/or attract magnets 910 and 912, respectively, feedback circuit controller 914 may further magnetically bias the rotor toward a latched position and thus minimize rotor oscillation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A bi-stable magnetic switch assembly, comprising:
   a stator having an axis and at least first and second magnetic portions angularly disposed there around;
   a rotor having at least one magnetic region configured for attraction to said first and said second portions, said rotor configured for rotation about the axis between (1) a first latched position wherein said region resides proximate to and spaced apart from said first portion, and (2) a second latched position wherein said region resides proximate to and spaced apart from said second portion;
   a spring coupled to said rotor for biasing said rotor to a position where said magnetic region resides intermediate said first and said second portions; and
   a coil associated with at least one of said first portion, said second portion, and said region for reducing the force of attraction between said region and (1) said first portion when said rotor is in the first latched position, and (2) said second portion when said rotor is in the second latched position.

2. A switch assembly according to claim 1 further comprising an arm coupled to said rotor and having an optical element fixedly coupled thereto, said arm positioning said optical element within an optical path when said rotor is in the first latched position and outside of the optical path when said rotor is in the second latched position.

3. A switch assembly according to claim 2 wherein said rotor further comprises a counterweight fixedly coupled to said arm.

4. A switch assembly according to claim 1 wherein said rotor includes a first plurality of angularly disposed magnetic regions, and wherein said stator includes a first plurality of angularly disposed magnetic portions including said first portion, said second portion, and at least one additional portion.

5. A switch assembly according to claim 4 wherein said rotor further comprises a second plurality of magnetic regions angularly disposed around the axis, each one of said second plurality of magnetic regions proximate a different one of said first plurality of regions along a line parallel to the axis, and wherein said stator further comprises a second plurality of magnetic portions disposed around the axis, each one of said second plurality of magnetic portions proximate a different one of said first plurality of portions along a line parallel to the axis.

6. A switch assembly according to claim 5 further comprising a plurality of control coils including said coil, each coil in said plurality coupled to one of said first plurality of magnetic portions and to one of said second plurality of magnetic portions and configured to reduce the force of attraction between said portions and said regions when energized.

7. A switch assembly according to claim 6 wherein said rotor is disposed within said stator.

8. A bi-stable magnetic latch assembly, comprising:
   a rotor configured for rotation about an axis between a first latched position and a second latched position, said rotor comprising a plurality of angularly spaced magnetic regions;
   a stator comprising a plurality of pairs of angularly spaced stator magnets, each of said magnet pairs for attracting one of said plurality of magnetic regions to (1) a first location substantially adjacent to and spaced apart from the first magnet in said pair when said rotor is in the first latched position, and (2) a second location substantially adjacent to and spaced apart from the second magnetic is said pair when said rotor is in the second latched position;
   a spring coupled to said rotor for biasing said rotor to a position where each of said regions resides intermediate the first and second locations; and
   a plurality of coils each associated with at least one of said magnetic regions and said magnet pairs, said coils configured to be energized to reduce the force of attraction between said regions and (1) said first magnets in each of said plurality of magnet pairs in the first latched position, and (2) said second magnets in each of said plurality of magnet pairs in the second latched position.

9. A latch assembly according to claim 8 wherein said rotor further comprises:
a permanent magnet; and
first and second pole bodies coupled to said permanent magnet and extending radially outward from said axis to form said plurality of magnetic regions.

10. A latch assembly according to claim 8 wherein said rotor further comprises a second plurality of magnetic regions angularly disposed around the axis, each one of said second plurality of magnetic regions proximate a different one of said first plurality of regions along a line parallel to the axis, and wherein said stator further comprises a second plurality of stator magnet pairs disposed around the axis, each of said second plurality of stator magnet pairs proximate a different one of said first plurality of stator magnet pairs along a line parallel to the axis.

11. A latch assembly according to claim 10 wherein each coil in said plurality of coils is coupled to a different magnet in said first plurality of stator magnet pairs and to a different magnet in said second plurality of stator magnet pairs.

12. A latch assembly according to claim 8 wherein said rotor is disposed within said stator.

13. A latch assembly according to claim 8 wherein the number of said pairs is equal to the number of said magnetic regions.

14. A latch assembly according to claim 13 wherein said stator comprises at least eight magnetic regions.

15. A latch assembly according to claim 8 further comprising an arm coupled to said rotor and having an optical element fixedly coupled proximate a first end thereof, said arm positioning said optical element within an optical path when said rotor is in the first latched position and outside of the optical path when said rotor is in the second latched position.

16. A bi-stable magnetic switch assembly, comprising:
a stator having an axis;
a rotor configured to rotate about the axis between a first latched position and a second latched position;
at least one magnetic latch grouping, comprising:
a first magnet fixedly coupled to said stator;
a second magnet fixedly coupled to said stator and angularly spaced from said first magnet; and
a third magnet fixedly coupled to said rotor, said third magnet configured for attraction to said first and said second magnet and for movement into (1) a first position adjacent and spaced apart from said first magnet when said rotor is in said first latched position, and (2) a second position adjacent and spaced from said second magnet when said rotor is in the second latched position;
a spring coupled to said stator and to said rotor and configured to bias said rotor to a position where said third magnet resides between said first and said second positions; and
at least one control coil coupled to at least one of said magnets in said magnetic latch group, said control coil configured to reduce the force of attraction between said third magnet and (1) said first magnet when said rotor is in the first latched position, and (2) said second magnet when said rotor is in the second latched position.

17. A switch assembly according to claim 16 wherein the number of magnetic latch groupings equals the number of magnets coupled to said stator.

18. A switch assembly according to claim 17 wherein said third magnet includes at least one pole body having multiple magnetic regions thereon, each magnetic region associated with a different magnetic latch grouping.

\* \* \* \* \*

UNITED STATES PATENT AND TRADEMARK OFFICE
CERTIFICATE OF CORRECTION

PATENT NO. : 7,659,802 B2 Page 1 of 1
APPLICATION NO. : 11/376829
DATED : February 9, 2010
INVENTOR(S) : Gonzalez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Thirtieth Day of November, 2010

David J. Kappos
*Director of the United States Patent and Trademark Office*